United States Patent
McRae et al.

(10) Patent No.: US 6,785,843 B1
(45) Date of Patent: Aug. 31, 2004

(54) DATA PLANE RESTART WITHOUT STATE CHANGE IN A CONTROL PLANE OF AN INTERMEDIATE NETWORK NODE

(76) Inventors: Andrew McRae, 21 Glencoe Close, Berowra NSW 2081 (AU); Johannes Markus Hoerler, 113 Ashwyn Ct., Cary, NC (US) 27511

(*) Notice: Subject to any disclaimer, the term of this patent is extended or adjusted under 35 U.S.C. 154(b) by 505 days.

(21) Appl. No.: 09/792,249

(22) Filed: Feb. 23, 2001

(51) Int. Cl.[7] .............................................. G06F 11/00
(52) U.S. Cl. ............................................. 714/23; 4/43
(58) Field of Search ............................... 714/4, 23, 43; 719/321, 327; 717/127

(56) References Cited

U.S. PATENT DOCUMENTS

| | | | |
|---|---|---|---|
| 5,636,341 A | * 6/1997 | Matsushita et al. | ............ 714/13 |
| 6,332,198 B1 | * 12/2001 | Simons et al. | ................. 714/6 |
| 6,463,550 B1 | * 10/2002 | Cepulis et al. | ................. 714/25 |
| 6,601,186 B1 | * 7/2003 | Fox et al. | ........................ 714/4 |

OTHER PUBLICATIONS

U.S. patent application Ser. No. 09/791,251, Roumas.

* cited by examiner

*Primary Examiner*—Scott Baderman
*Assistant Examiner*—Anne L. Damiano

(57) ABSTRACT

A system and technique restarts a data plane of an intermediate node, such as an aggregation router, of a computer network without changing the state of a control plane in the router. The aggregation router comprises a control plane that includes a supervisor processor configured to manage traffic forwarding operations of the node. To that end, the supervisor processor maintains a current state of the control plane pertaining to, e.g., routing protocols and interface states of line cards within the router. The aggregation router further comprises a data plane that includes hardware components, such as a forwarding engine, configured to perform forwarding operations for data forwarded by the router.

33 Claims, 7 Drawing Sheets

DATA PLANE RESTART WITHOUT STATE CHANGE IN A CONTROL PLANE OF AN INTERMEDIATE NETWORK NODE

CROSS-REFERENCE TO RELATED APPLICATIONS

The present invention is related to the following co-pending and commonly assigned U.S. patent application Ser. No. 09/791,251 filed on Feb. 23, 2001, titled, Message Aggregator for Channelized Interface Programming, which was filed on even date herewith and assigned to the assignee of the present invention.

FIELD OF THE INVENTION

The present invention relates to intermediate nodes of a communications network and, in particular, to the infrastructure of an intermediate node, such as an aggregation router, used in a communications network, such as a computer network.

BACKGROUND OF THE INVENTION

A computer network is a geographically distributed collection of interconnected communication links and segments for transporting data between nodes, such as computers. Many types of network segments are available, with the types ranging from local area networks (LAN) to wide area networks (WAN). For example, the LAN may typically connect personal computers and workstations over dedicated, private communications links, whereas the WAN may connect large numbers of nodes over long-distance communications links, such as common carrier telephone lines. The Internet is an example of a WAN that connects disparate networks throughout the world, providing global communication between nodes on various networks. The nodes typically communicate over the network by exchanging discrete frames, cells or packets of data according to predefined protocols. In this context, a protocol consists of a set of rules defining how the nodes interact with each other.

Computer networks may be further interconnected by an intermediate network node, such as a switch or router, having a plurality of ports that may be coupled to the networks. To interconnect dispersed computer networks and/or provide Internet connectivity, many organizations rely on the infrastructure and facilities of Internet Service Providers (ISPs). ISPs typically own one or more backbone networks that are configured to provide high-speed connection to the Internet. To interconnect private networks that are geographically diverse, an organization may subscribe to one or more ISPs and couple each of its private networks to the ISP's equipment. Here, the router may be utilized to interconnect a plurality of private networks or subscribers to an IP "backbone" network. Routers typically operate at the network layer of a communications protocol stack, such as the internetwork layer of the Transmission Control Protocol/Internet Protocol (TCP/IP) communications architecture.

Simple networks may be constructed using general-purpose routers interconnected by links owned or leased by ISPs. As networks become more complex with greater numbers of elements, additional structure may be required. In a complex network, structure can be imposed on routers by assigning specific jobs to particular routers. A common approach for ISP networks is to divide assignments among access routers and backbone routers. An access router provides individual subscribers access to the network by way of large numbers of relatively low-speed ports connected to the subscribers. Backbone routers, on the other hand, provide transports to Internet backbones and are configured to provide high forwarding rates on fast interfaces. ISPs may impose further physical structure on their networks by organizing them into points of presence (POP). An ISP network usually consists of a number of POPs, each of which comprises a physical location wherein a set of access and backbone routers is located.

As Internet traffic increases, the demand for access routers to handle increased density and backbone routers to handle greater throughput becomes more important. In this context, increased density denotes a greater number of subscriber ports that can be terminated on a single router. Such requirements can be met most efficiently with platforms designed for specific applications. An example of such a specifically designed platform is an aggregation router. The aggregation router is an access router configured to provide high quality of service and guaranteed bandwidth for both data and voice traffic destined for the Internet. The aggregation router also provides a high degree of security for such traffic. These functions are considered "high-touch" features that necessitate substantial processing of the traffic by the router. More notably, the aggregation router is configured to accommodate increased density by aggregating a large number of leased lines from ISP subscribers onto a few trunk lines coupled to an Internet backbone.

The infrastructure of a typical router comprises functional components organized as a control plane and a data plane. The control plane includes the functional components needed to manage the traffic forwarding features of the router. These features include routing protocols, configuration information and other similar functions that determine the destinations of data packets based on information other than that contained within the packets. The data plane, on the other hand, includes functional components needed to perform forwarding operations for the packets.

For a single processor router, the control and data planes are typically implemented within the single processor. However, for some high performance routers, these planes are implemented within separate devices of the intermediate node. For example, the control plane may be implemented in a supervisor processor, such as a route processor, whereas the data plane may be implemented within a hardware-assist device, such as a co-processor or forwarding processor. In other words, the data plane is typically implemented in a specialized piece of hardware that is separate from the hardware that implements the control plane.

For implementations that require high availability, the data plane tends to be generally simple in terms of its organization and functions of the hardware and software. That is, the forwarding processor may be configured to operate reliably by reducing the complexity of its functional components. In contrast, the control plane tends to be more complex in terms of the quality and quantity of software operating on the supervisor processor. Failures are thus more likely to occur in the supervisor processor when executing such complicated code. In order to ensure high availability in an intermediate network node, it is desirable to configure the node such that if a failure arises with the control plane that requires restarting and reloading of software executing on the supervisor processor, the data plane continues to operate correctly. An example of such a high availability intermediate node is an asynchronous transfer mode (ATM) switch having a relatively simple switch fabric used to forward ATM cells from its input interfaces to output interfaces.

However, high-performance routers have evolved to where their data planes have become more complex in terms of software executing on their forwarding processors. This has increased the possibility of fatal errors arising in the forwarding processors that, in turn, halt forwarding of data traffic in the data planes. In a situation where a fatal error is detected in the data plane hardware or software, thereby requiring a reset and restart of the forwarding processor, the conventional approach is to restart the entire router including a restart of the control plane. Yet restarting of the entire router takes a relatively long period of time, e.g., on the order of minutes.

Specifically, restarting of the control plane requires reloading of an operating system executing on the supervisor processor, as well as reinitializing that operating system to a point where it acquires its necessary state. For example, re-initialization of the operating system includes acquiring lost dynamic state, such as routing protocol state information. A control plane restart is thus "visible" to neighboring routers as a topology change in the network that requires those neighbors having "knowledge" of the network to re-compute their routing databases when the restarted router is back online. In addition, the router must re-establish connections with its neighbors and exchange routing databases with those neighbors so as to "converge" its routing database. As noted, such activity consumes an excessive amount of time and the present invention is directed to a technique that addresses this problem.

SUMMARY OF THE INVENTION

The present invention comprises a system and technique for restarting a data plane of an intermediate node, such as an aggregation router, of a computer network without changing the state of a control plane in the router. The control plane includes a supervisor processor, such as a route processor, configured to manage traffic forwarding operations of the node. To that end, the route processor maintains a current state of the control plane pertaining to, e.g., routing protocols and interface states of line cards within the router. The aggregation router further comprises a data plane that includes hardware components, such as a forwarding engine, configured to perform forwarding operations for data forwarded by the router.

According to an aspect of the inventive technique, when the route processor detects a fatal error in the data plane, e.g., via an exception condition reported by data plane hardware, it restarts only the data plane without changing the state of the control plane. That is, the route processor resets the hardware components of the data plane, reloads software into those appropriate components and then resynchronizes the forwarding engine with state information stored in the control plane that is relevant to the data plane, e.g., the interface states of the line cards.

According to another aspect of the inventive technique, independent software modules, or clients, logically interact with "reset" software code of an operating system so that only the relevant portions of the code that control the data plane are executed. In response to detection of a fatal error by the control plane, driver software executing on the route processor notifies these clients, e.g., via registered call back functions, about the error. An exception handler routine is then invoked to resolve the error. Meanwhile, the clients terminate further attempts to access the data plane hardware while it is in an exception state.

After the error condition is resolved, the route processor resets the data plane hardware, reloads the software (i.e., micro-code) executing on the forwarding engine and resynchronizes the state stored on the control plane with relevant state needed by the data plane. The clients are then notified that the data plane hardware may once again be accessed and those clients proceed to download their specific configuration information into the forwarding engine. After the data plane is restarted, data traffic begins to flow through the forwarding engine.

An advantage of the data plane restart invention is that state information maintained on the control plane is preserved. Thus, resetting and restarting of the data plane can be performed in a few seconds rather than several minutes needed to reacquire the state information in order to restart the entire aggregation router, including the control plane. In addition, the router is still considered an active intermediate node to its neighboring routers in the network even though the data traffic forwarded to the router does does not flow through the data plane. This aspect of the invention obviates the need to recompute and re-converge forwarding databases in the network.

BRIEF DESCRIPTION OF THE DRAWINGS

The above and further advantages of the invention may be better understood by referring to the following description in conjunction with the accompanying drawings in which like reference numerals indicate identical or finctionally similar elements.

DETAILED DESCRIPTION OF AN ILLUSTRATIVE EMBODIMENT

Figure 1:
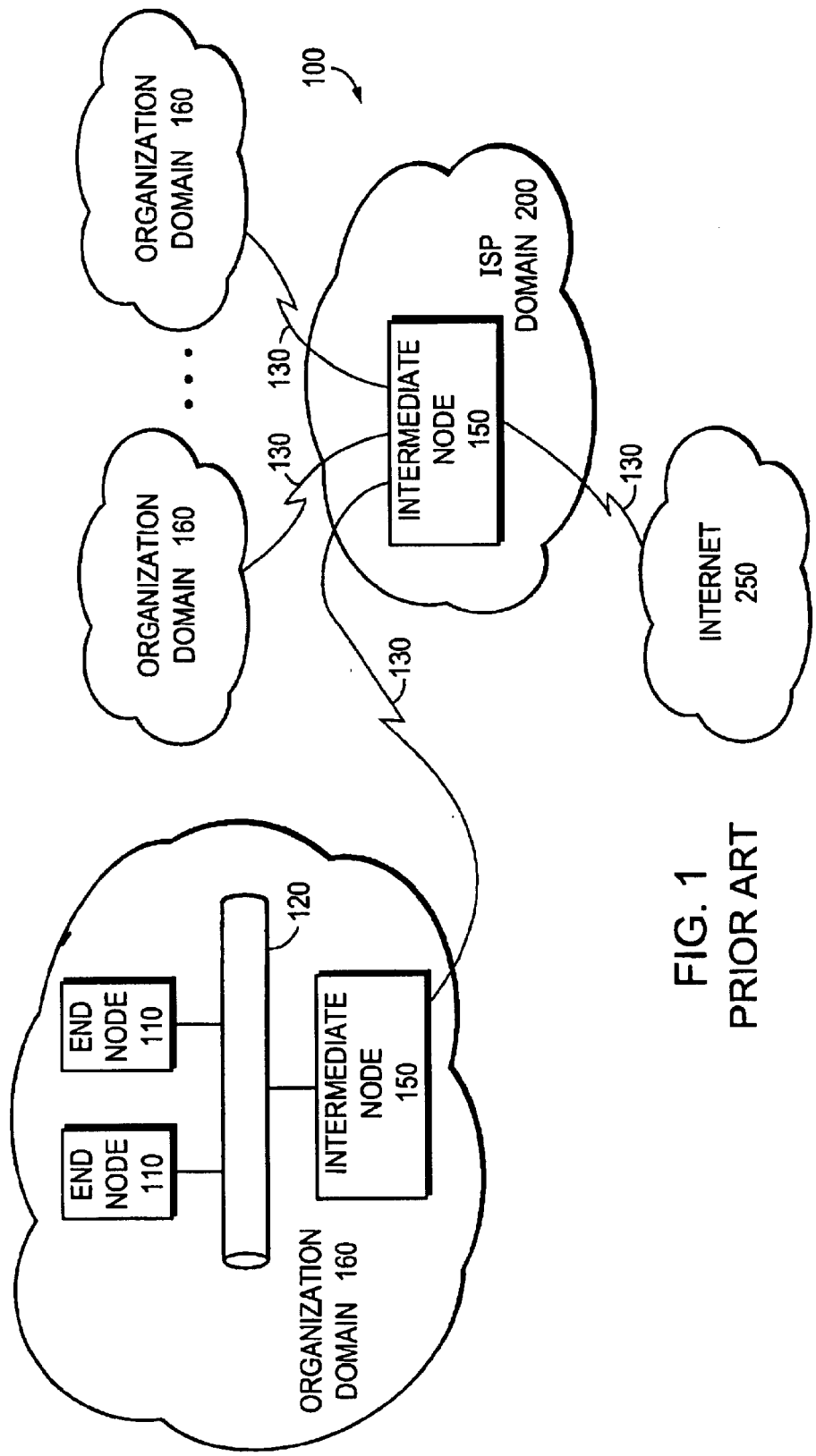
FIG. 1 is a schematic block diagram of a network including a collection of communication links and segments organized into a plurality of subscriber domains coupled to an Internet service provider (ISP) domain.

FIG. 1 is a schematic block diagram of a computer network 100 comprising a collection of communication links and segments connected to a plurality of nodes, such as end nodes 110 and intermediate nodes 150. The network links and segments may comprise local area networks (LANs) 120 and wide area network (WAN) links 130 interconnected by intermediate nodes 150, such as network switches or routers, to form an internetwork of computer nodes. These internetworked nodes communicate by exchanging data packets according to a predefined set of protocols, such as the Transmission Control Protocol/ Internet Protocol (TCP/IP). It should be noted that other techniques/protocols, such as the Hypertext Transfer Protocol (HTTP), may be advantageously used with the present invention.

Figure 2:
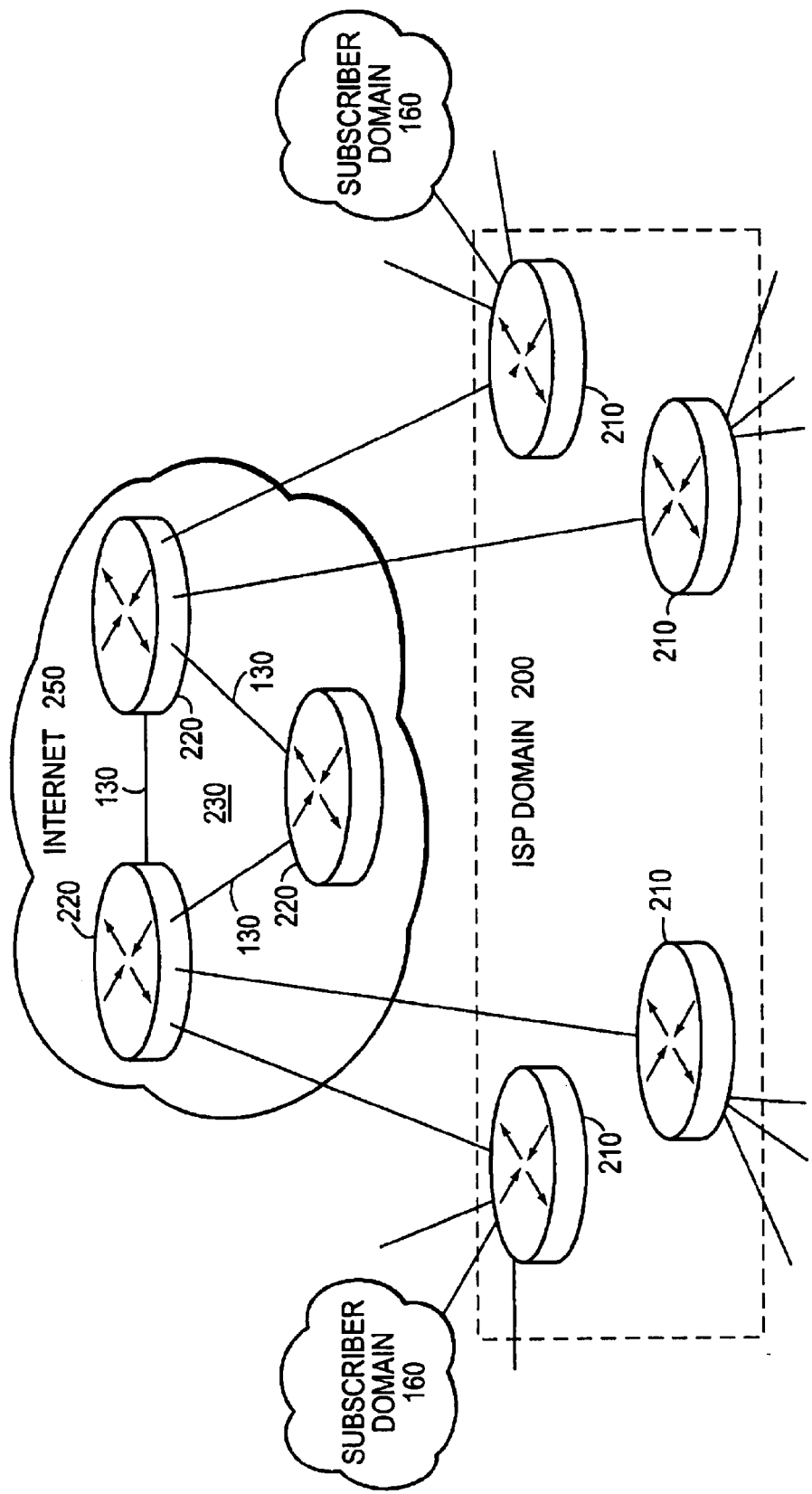
FIG. 2 is a schematic block diagram of an ISP domain comprising a plurality of interconnected access and backbone routers.

To interconnect their dispersed private computer networks and/or provide Internet connectivity, many organizations rely on the infrastructure and facilities of Internet service providers (ISPs) rather than purchase and configure the necessary equipment themselves. In the illustrative embodiment, the computer network 100 is organized into a plurality of domains, including organization domains 160 of private networks coupled to an ISP domain 200. An organization 160 may subscribe to one or more ISPs 200 and couple each of its private networks to the ISP's equipment. FIG. 2 is a schematic block diagram of an ISP domain 200 comprising a plurality of interconnected access and backbone routers 210, 220. The access routers 210 connect the individual organization or subscriber domains 160 to the backbone routers 220 via relatively low-speed ports connected to the subscribers. The backbone routers 220 are interconnected by WAN links 130 to form one or more backbone networks 230 configured to provide high-speed, high-capacity, wide area connectivity to the Internet, represented herein as Internet cloud 250.

Figure 3:
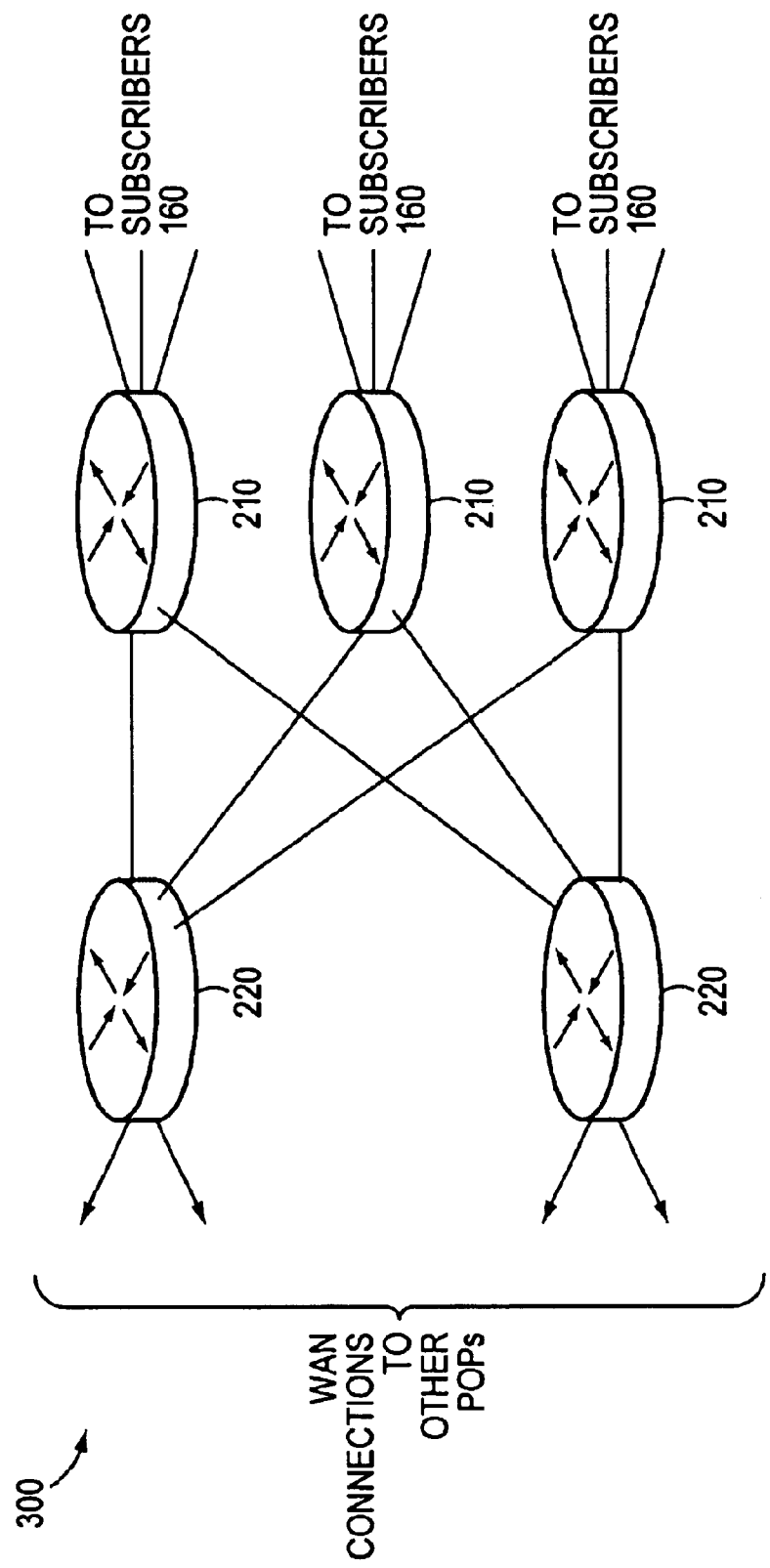
FIG. 3 is a schematic block diagram of an illustrative embodiment of an ISP point of presence (POP) that may be advantageously used with the present invention.

An ISP domain 200 may be further organized into points of presence (POP), each of which comprises a physical location wherein a set of access and backbone routers is located. FIG. 3 is a schematic block diagram of an illustrative embodiment of a POP 300 that may be advantageously used with the present invention. The POP 300 comprises a plurality of backbone routers 220 coupled to access routers 210 equipped with redundant trunk connections. The use of more than one backbone router enhances network availability, as does the use of redundant trunk connections on the access routers. The backbone routers 220 and access routers 210 are maintained separately so that backbone router configuration can be kept relatively stable over time. Backbone routers are not affected when individual subscribers add or remove value-added services or when individual subscribers are added to or removed from the access routers 210. In addition, access routers can be added as new subscribers are brought onto the network.

As Internet traffic increases, the demand for access routers 210 to handle increased density, and backbone routers 220 to handle greater throughput, becomes more important. Increased density denotes a greater number of subscriber ports that can be terminated on a single access router. An aggregation router is an access router configured to accommodate increased density by aggregating a large number of leased lines from ISP subscribers onto a few trunk lines coupled to an Internet backbone. That is, the aggregator essentially functions as a large "fan-in" device wherein a plurality of relatively low-speed subscriber input links is aggregated onto at least one high-speed output trunk to a backbone network of the Internet.

Figure 4:
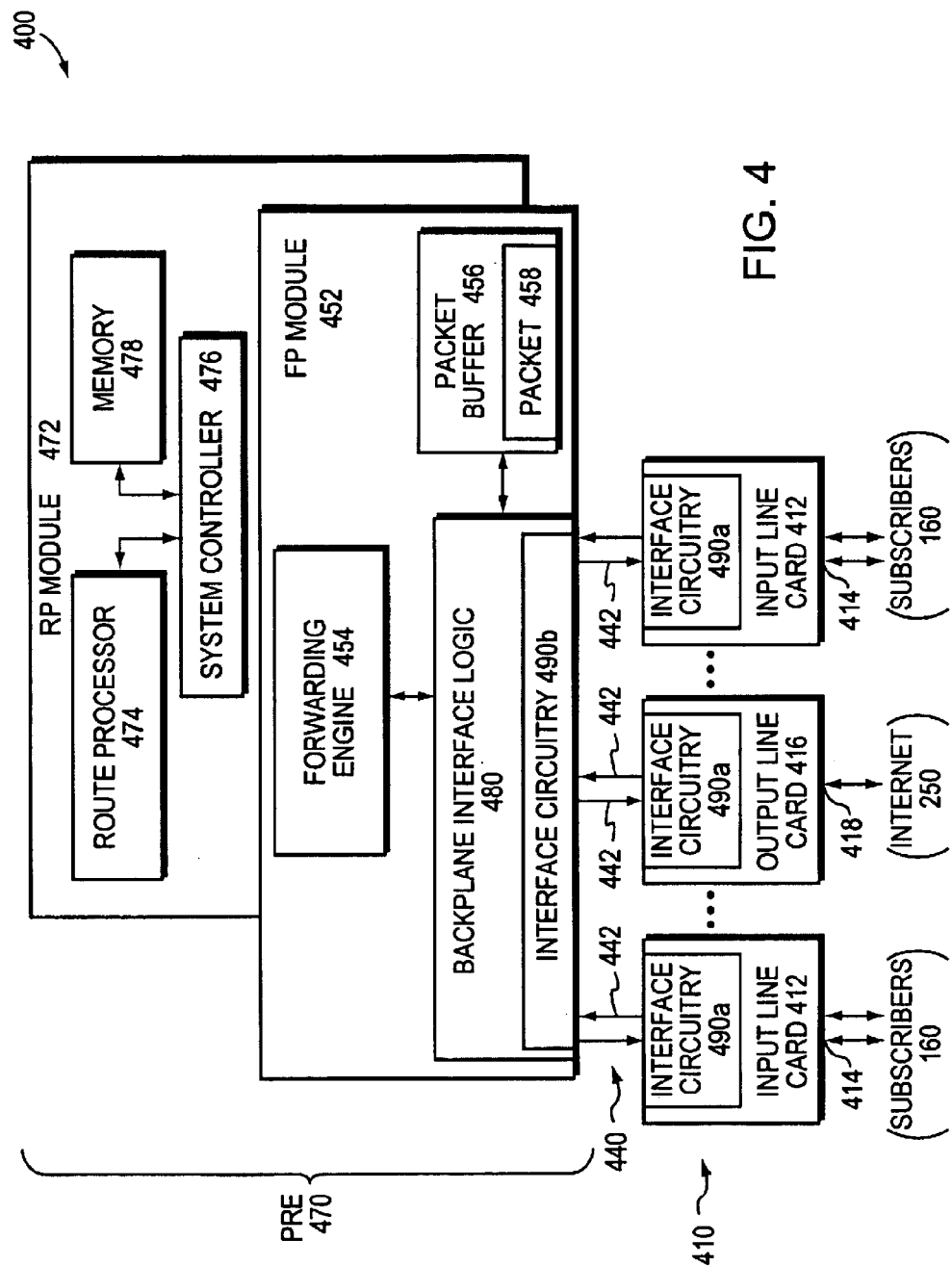
FIG. 4 is a schematic block diagram of an aggregation router that may be advantageously used with the present invention.

FIG. 4 is a schematic block diagram of an aggregation router 400 that may be advantageously used with the present invention. The aggregation router comprises a plurality of line cards 410 coupled to at least one performance routing engine (PRE 470) via a unidirectional (i.e., point-to-point) interconnect system 440. The line cards 410 include a plurality of input cards 412 having input ports 414 coupled to subscribers 160 and at least one output "trunk" card 416 configured to aggregate the subscriber inputs over at least one output port 418. The PRE 470 is an assembly comprising a fast packet "forwarding" processor (FP) module 452 and a route processor (RP) module 472 adapted to perform packet forwarding and routing operations, respectively. The FP and RP modules are preferably interconnected in a "mezzanine" arrangement to form the PRE 470. The PRE assembly also provides quality of service (QoS) functions for complete packets received from each input line card over the interconnect system. To that end, the interconnect system 440 comprises a plurality of high-speed unidirectional links 442 coupling the PRE to each line card 410.

The RP module 472 is a processor-based, routing system suite comprising functionality incorporated within a typical router. That is, the RP module comprises a general-purpose processor 474 (e.g., a MIPS route processor) coupled to a system controller 476 and memory 478. The memory 478 comprises synchronous dynamic random access memory (SDRAM) storage locations addressable by the processor 474 for storing software programs and data structures accessed by the components. A network routing operating system, portions of which are typically resident in memory and executed by the route processor, functionally organizes the router by, inter alia, invoking network operations in support of software processes executing on the router. The route processor 474 is configured to construct and load routing tables used by the FP module 452. The processor 474 also performs configuration management functions of the aggregation router 400 and communicates with neighboring peer routers to exchange protocol data units used to construct the routing tables in accordance with conventional routing algorithms. It will be apparent to those skilled in the art that other memory means, including various computer readable media, may be used for storing and executing program instructions pertaining to the operation of the router.

The FP module 452 is responsible for rendering forwarding decisions for the aggregation router and, to that end, includes a forwarding engine 454 (such as an arrayed processing engine) coupled to a high-performance backplane interface logic circuit 480. The forwarding engine 454 is preferably embodied as two high performance, application specific integrated circuits (ASICs) having a plurality of processors arrayed as four (4) rows and eight (8) columns in a 4×8 arrayed configuration, wherein each column is coupled to a FP memory. However, it will be understood to those skilled in the art that other arrayed configurations, such as an 8×2 or 8×8 array, may be used in accordance with the present invention. The forwarding engine 454 essentially comprises the entire forwarding path functionality of the aggregator.

Interface circuitry 490 coupled to the ends of the unidirectional links 442 is resident on both the line cards 410 and the backplane logic circuit 480. The backplane logic circuit 480 is also preferably embodied as a high performance ASIC, hereinafter referred to as the Cobalt ASIC, which is configured to further interface the line cards to a packet buffer 456 of the FP module. The packet buffer 456 is a memory used to store packets 458 as the forwarding engine 454 determines where and when they should be forwarded within the aggregation router. For example, the packet buffer may be used to store low priority data packets while high priority, low latency voice packets are prioritized by the forwarding engine to an output card (e.g., the trunk card 416) of the aggregation router. An example of a backplane logic circuit that may be advantageously used with the present invention is disclosed in co-pending and commonly-owned U.S. patent application Ser. No. (112025-0438) titled High Performance Interface Logic Architecture of an Intermediate Network Node, which application is hereby incorporated by reference as though fully set forth herein.

The aggregation router 400 illustratively includes sixteen (16) line cards 410, each of which may be configured for an OC-12 (622 Mbps) data rate. Thus, the point-to-point links 442 coupled to the line cards must be capable of supporting such data rates. An interconnect protocol is provided that enables encoding of packets over the point-to-point links of the interconnect system to thereby limit the bandwidth consumed by overhead when transmitting the packets within the aggregation router. An example of an interconnect protocol that may be advantageously used with the present invention is disclosed in co-pending and commonly-owned U.S. patent application Ser. No. 09/791,062 filed Feb. 22, 2001, titled High Performance Protocol for an Interconnect System of an Intermediate Network Node, which application is hereby incorporated by reference as though fully set forth herein.

The interface circuitry 490 includes interconnect ports coupled to the point-to-point links 442 of the interconnect system 440 and implements a unidirectional, point-to-point clock forwarding technique that is configured for direct ASIC-to-ASIC transmission over a backplane of the aggregation router. As a result, the interface circuitry 490a resident on the line cards 410 is preferably embodied within a high-performance ASIC, hereinafter referred to as the Barium ASIC, whereas the interface circuitry 490b is resident on the Cobalt ASIC. The interface circuitry generally converts conventional formats of data received at the line cards 410 to a protocol format for transmission from, e.g., the Barium ASIC over the interconnect system 440 to the Cobalt ASIC. The ASICs also include circuitry to perform cyclic redundancy code (CRC) generation and checking on packets, along with interconnect format checking.

Figure 5:
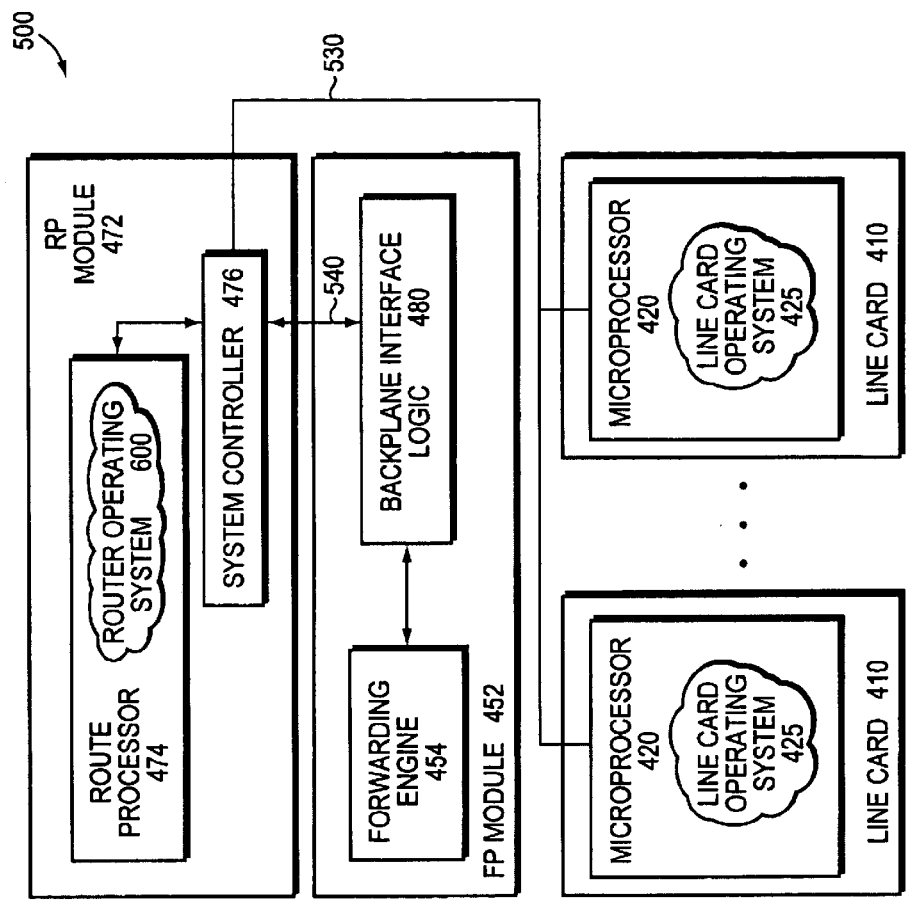
FIG. 5 is a schematic block diagram illustrating a functional infrastructure of the aggregation router of FIG. 4.

FIG. 5 is a schematic block diagram illustrating the functional infrastructure 500 of the aggregation router. A line card operating system 425 executes on microprocessors 420 of the line cards 410 and a network routing operating system 600 executes on the route processor 474 of the RP module 472. An example of a network routing operating system that may be advantageously used with the present invention is the Internetworking Operating System (IOS), whereas an example of a line card operating system is LC DOS, both of which are available from Cisco Systems Inc. LC DOS is a "light weight" version of Cisco IOS® that is optimized for line card operation and that includes a built-in interprocessor communication (IPC) mechanism along with an on-line insertion and removal (OIR) mechanism configured to provide resiliency in a line card environment.

The line card operating system 425 provides maintenance functions for the hardware components of the line cards and communicates with the router operating system to exchange configuration information along with statistics reporting and event/alarm notification. General images of the line card operating system reside within the router operating system. When a new image of the router operating system is booted, a determination is made whether the version of the line card operating system executing on the line cards is the same as the current version residing on the router operating system. If not, the router operating system downloads the current image of the line card operating system to the line cards. The line card operating system is a "self loading" operating system in that each instance of the system that is running on the line cards includes a loader function that facilitates automatic, efficient downloading of images over a backplane Ethernet (BPE) connection 530 from the router operating system.

Broadly stated, the functional infrastructure of the aggregation router is divided into a data plane and a control plane. The data plane includes components used to retrieve data packets from the network and provide those packets to the PRE (and vice versa). To that end, the data plane extends from the ports 414, 418 on the line cards through the Barium ASICs over the interconnect system 440 to the Cobalt ASIC and ultimately to the forwarding engine 454 of the FP module 452. In contrast, the control plane includes those entities used to manage/control traffic forwarding operations of the aggregation router and, to that end, extends from the microprocessors 420 on the line cards 410 over the BPE 530 to the route processor 474 on the RP module 472. Notably, the line card microprocessors 420 generally do not have access to the data plane in order to send information to the RP module through the FP module. Moreover, the data plane is used primarily for transporting data packets between the line cards and the PRE, although some control information (e.g., flow control) relating to control external to the aggregation router may flow over the data plane.

In sum, the infrastructure of the aggregation router includes distributed microprocessor entities resident on the line cards that perform local processing and interfacing to the physical port circuitry on the line cards, but that do not have direct access to the route processor over the data plane. The software architecture of the aggregator includes layering that provides separation between low-level functionality on the line cards (e.g., a specific interface chip, such as a channelized controller at the physical port circuitry) and high-level generic functions of the router operating system on the RP module. This separation layer of the software architecture provides a distinct interface between a generic software layer of the router operating system and the physical port interface layer of the router.

The present invention comprises a system and technique for restarting the data plane of the aggregation router without changing the state of the control plane in the router. The route processor maintains a current state of the control plane pertaining to, e.g., routing protocols and interface states of line cards within the router. Broadly stated, the invention provides the ability to reset the forwarding engine of the data plane, including re-downloading of software and restarting of the processors, without having to reset the operating system. Restarting of only the FP module within the aggregator is possible because the ability to acquire and distribute configuration information between the line cards and the RP module is independent of the forwarding path of the router. By removing the forwarding path from the control plane, hardware faults that are detected in the forwarding engine can be resolved (i.e., by restarting the forwarding engine) without having to restart the route processor and operating system. As noted, restarting of the forwarding engine hardware is much quicker and efficient than having to restart the entire router.

Figure 6:
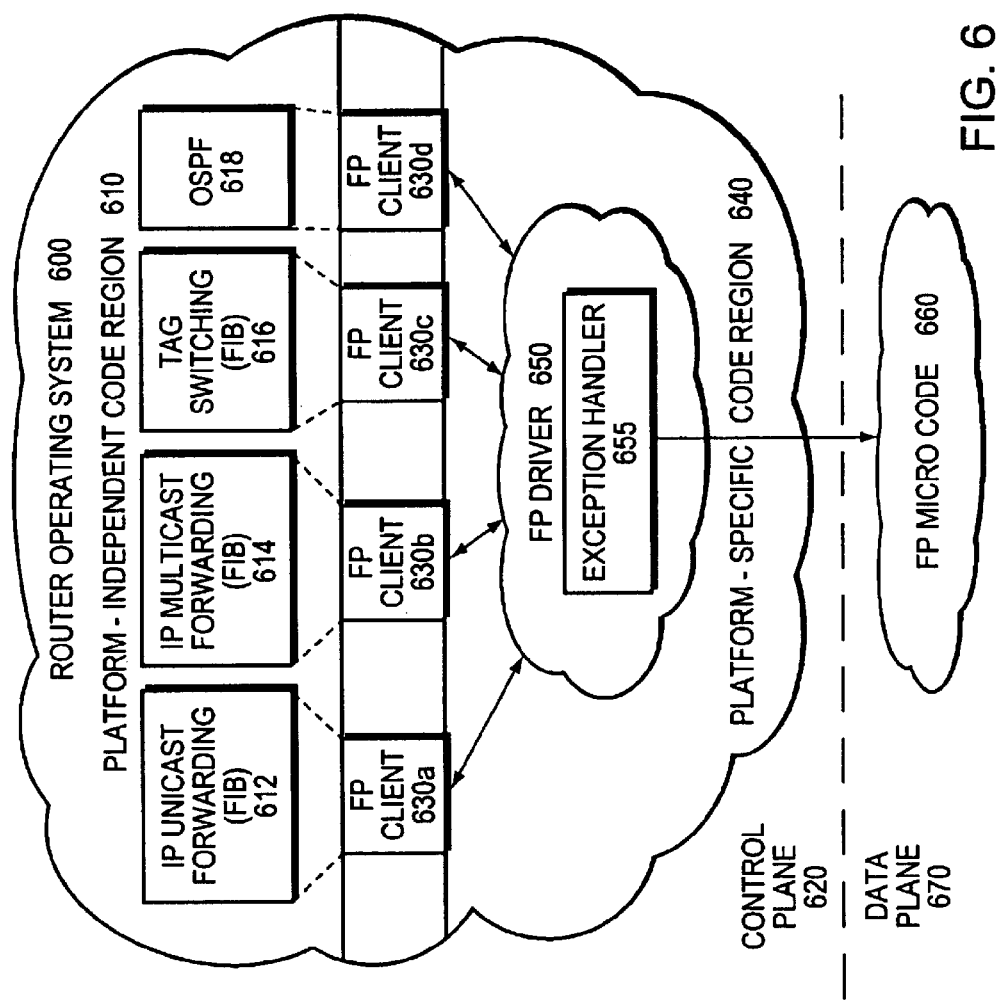
FIG. 6 is a functional block diagram illustrating an architecture of an operating system that may be advantageously used with the present invention.

FIG. 6 is a functional block diagram illustrating the architecture of the router operating system 600 (e.g., Cisco IOS) that is configured to reset and resynchronize the data plane 670 of the aggregation router 400 without affecting (changing) state information stored in the control plane 620 of that router. The operating system 600 is functionally divided into a generic, platform-independent code region 610 that runs on any router platform and a platform-specific code region 640, including drivers, that "hook" the generic code into the specific platforms used to implement the operating system.

In the illustrative embodiment, the platform-specific code region 640 includes a FP driver 650 configured to operate with the forwarding engine 454 of the data plane 670 used in the aggregation router. The operating system 600 includes a plurality of specialized pieces of code or FP clients 630 that reside between the generic region 610 and the platform-specific region 640 of the operating system 600. The FP clients interact with the FP driver 650 to essentially translate software representing generic functions of the operating system into platform-specific format for use by the FP driver.

The software code downloaded by the FP driver into the forwarding engine 454 is a binary, assembly language image or FP micro-code 660 adapted for execution by processors of the forwarding engine 454.

Preferably, the FP micro-code 660 is compiled into the operating system and comprises initialization code and operational code that implements functions of the operating system. Initially, the initialization code is downloaded into instruction memories of the processors within the forwarding engine for execution by the processors. The operational code is initially loaded into FP memories associated with the forwarding engine and, at a point in time directed by the route processor 474 after the initialization code has executed, the code is then loaded into the instruction memories of the processors. The FP memories also store initialized data downloaded from the operating system of the control plane.

The micro-code 660 is illustratively organized as bundles of precompiled coded segments in a binary file format that are downloaded over a conventional peripheral computer interconnect (PCI) bus 540 from the RP module 472 into the FP memories associated with the forwarding engine. The PCI bus is also used for communication between the route processor 474 on the RP module 472 and the forwarding engine 454 on the FP module 452. In addition, the PCI bus enables communication between the route processor and the Cobalt ASIC to, inter alia, access registers needed to "start" the interconnect system 440 and gather statistics. Thus, the PCI bus 540 provides a mechanism whereby both control and data information may be exchanged between the RP and FP modules.

Within the generic code region 610 of the operating system 600, there are further pieces of code that are used to build forwarding information base (FIB) tables subsequently downloaded by the FP driver 650 into the forwarding engine for use by the FP micro-code 660. Examples of these various pieces of code include IP unicast forwarding code 612, IP multicast forwarding code 614 and tag switching code 616. Each of these "features" of the operating system has an associated FP client 630 that "owns" the corresponding FIB table in memory of the forwarding engine 454. Apportionment of the operating system into various features results in the development of software modules that essentially increases the reliability of the operating system. The Cisco IOS operating system is an example of a modular operating system that, as noted, may be advantageously used with the present invention. The advantage of developing separate modular features of the operating system is realized by a defined application programming interface (API) mechanism that allows the various modules to communicate with other portions of the operating system code.

For example, OSPF code 618 executing within the generic code region 610 of the operating system 600 builds a routing table that is translated by a FP client 630d into a format for use by the FP micro-code 660 executing on the forwarding engine 454. The FP client 630d and FP driver 650 cooperate to download the table contents to the forwarding engine. When the forwarding engine requires restart in response to, e.g., detection of a fatal error by the route processor 474, certain hardware on the FP module 452 is temporarily unavailable. Accordingly, the FP client 630d is instructed to cease downloading of further updates to the OSPF FIB table. After the FP hardware has been reinitialized, the FP client is instructed to download the entire OSPF FIB table into the forwarding engine 454 because, as result of re-initialization, the engine is in essentially a "virgin" state. The FP driver 650 issues these instructions to the FP client 630d through call back functions of the API mechanism.

According to an aspect of the inventive technique, when the route processor detects a fatal error in the data plane, e.g., via an exception condition/state reported by data plane hardware, it restarts only the data plane without changing the state of the control plane. That is, the route processor resets the hardware components of the data plane, reloads software into those appropriate components and then resynchronizes the components (i.e., the forwarding engine) with state information stored in the control plane that is relevant to the data plane, e.g., the interface states of the line cards. The fatal error in the data plane 670 is generally detected by the route processor 474 of the control plane 620 in response to an interrupt (exception) asserted by either the forwarding engine 454 or the Cobalt ASIC on the FP module 452. As a result, the FP module hardware is placed in a reset state.

In response to the exception, the operating system 600 invokes an exception handler routine 655 that determines the source of the error by collecting state information used to debug the error. The exception handler 655 is preferably part of the FP driver code 650 executed by the route processor 474. Once the exception handler is invoked, the FP driver initiates a call back function to the FP clients 630 instructing them to halt further downloads of updated information to the FP module hardware. The FP driver then proceeds to retrieve state information stored in the registers and internal memories of the forwarding engine, and stores that state information in the memory 478 of the RP module 472. Once all the state information has been saved, the hardware components of the data plane 670 are placed into a restart state that essentially "wipes-out" any software that could have created the exception condition.

In general, a reset event typically refers to a condition wherein a piece of hardware is non-responsive to an external input. When the piece of hardware emerges from reset, it is in a state similar to when the hardware is initially powered on. At this point, an initialization sequence is executed to bring the hardware to a functional state. When resetting the FP module, not only is the forwarding engine reset, but the Cobalt ASIC is also reset. In the latter case, pointers (within the Cobalt ASIC) to data structures, such as direct memory access (DMA) descriptor rings, in the RP memory 478 must be re-established and buffers need to be re-allocated. In addition, an internal packet memory of the Cobalt ASIC is cleared and DMA engines are restarted. In essence, the initialization sequence comprises a plurality of stages that incrementally bring the Cobalt ASIC and forwarding engine to a fully operational state.

At this point, the forwarding engine 454 and FP micro-code 660 are in operational states, and the FP driver 650 may "call back" to the FP clients 630, instructing them to reinitialize themselves. In response, the FP clients 630 identify those tables that should be loaded into the forwarding engine and proceed to download that code through the FP driver 650. Downloading of information between the RP control plane 620 and the FP data plane 670 takes place over the PCI bus 540.

Once the FP module hardware emerges from reset, its components have been reinitialized, the FP micro-code has been downloaded and the first stages of the initialization sequence have been initiated. The FP driver 650 informs the FP clients 630 of the resetting and reinitialization of the FP hardware so that the FP clients can begin downloading their configuration state (e.g., FIB tables) to the forwarding engine 454. According to the invention, resynchronization comprises reloading of the configuration and state information (needed to restart and reinitialize the forwarding engine) from the control plane 620 to the data plane 670. Notably, the configuration and state information is distributed among the various features of the operating system. Once resynchronization has completed, the FP micro-code 660 executed by the forwarding engine is instructed to begin forwarding data traffic (e.g., packets) and the aggregation router 400 is essentially back online.

Figure 7:
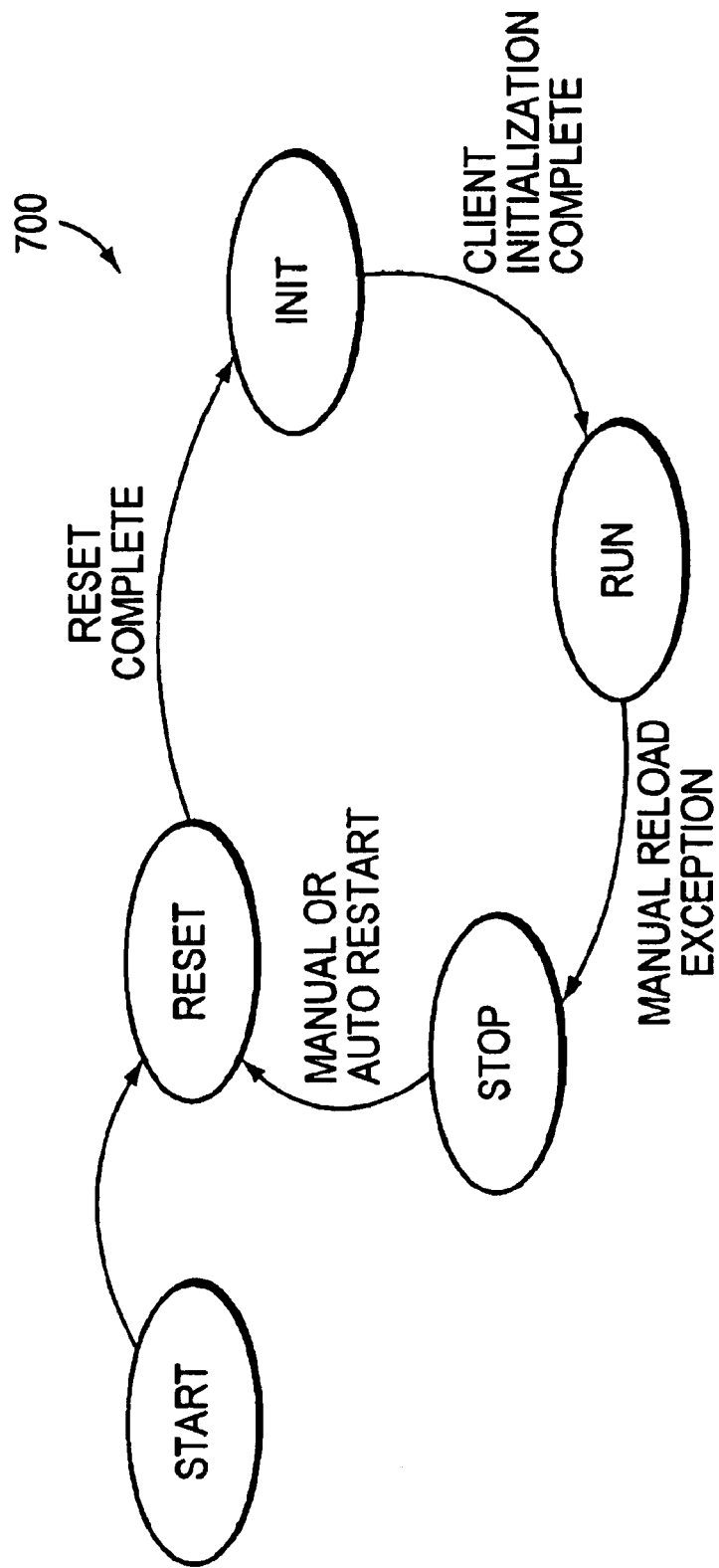
FIG. 7 is a state diagram illustrating various events and defined states in accordance with the present invention.

In the illustrative embodiment, each FP client 630 is configured to respond to a series of events that may occur within the aggregation router. FIG. 7 is a state diagram 700 illustrating various FP module hardware and FP client events and defined states, including reset, initialize (init), run, start and stop. In response to a reset event, the FP driver 650 invokes (via a call back function of the API) a reset vector that instructs the FP clients 630 to suspend access to the FP module hardware. The FP clients then halt, divert or "queue" (temporarily store) any packets or messages being sent to the FP hardware, since that hardware is in a non-operational state. In addition, the FP clients "free" (release) any dynamically allocated resources, such as buffers and dynamic state data structures, which were allocated as part of FP module processing.

Once the data plane emerges from reset and at a defined point of the initialization sequence, the FP driver 650 calls an init vector that instructs the FP clients to allocate system resources, such as FP memory of the forwarding engine, if not already allocated. In addition, the init vector instructs the clients 630 to initialize data structures both in the route processor (if necessary) and within the FP memory in anticipation of commencement of forwarding engine operation (i.e., the run event). The FP clients re-initialize all data structures during the init phase since there is no guarantee that previously-allocated data structures have not been corrupted or that, during the FP reset, the contents of the FP memory have been cleared. Furthermore, the FP clients are instructed to initialize other system objects (e.g., drivers) so that they can begin interacting with the FP module hardware.

The FP driver 650 invokes a start vector in response to a start event, which denotes that the FP hardware resources needed by the operating system have been enabled and are now accessible. In particular, the start vector informs the FP clients that the FP micro-code 660 has been fully downloaded and initialized, and is now running. The FP clients 630 may thus begin downloading all of their configuration and state information into the FP memory. In contrast, the FP driver calls a stop vector when the FP module hardware has asserted an exception or is about to be reset; in response, the FP clients disable any FP operations. The stop vector call back may be invoked from an interrupt level SO that the FP client should not free or reinitialize any resource, but rather simply "flag" the FP hardware as being out-of-operation. Therefore, no accesses to FP hardware should be performed during the stop event phase.

In sum, the present invention comprises a system and method for (i) resetting and restarting of the data plane without affecting the control plane, and (ii) after the data plane hardware has been reset, resynchronizing the data plane with state stored in the control plane. Resetting of the data plane 670 without affecting the state stored in the control plane 620 of the router 400 generally requires a coupling/decoupling mechanism between the two planes of the router. The PCI bus 540 provides a physical coupling between the planes, whereas the FP driver 650 provides a logical coupling between the planes. Essentially, the FP driver provides a single point of access (control) when either downloading or retrieving information to and from the data plane by the operating system residing on the control plane.

An advantage of the data plane restart invention is that state information maintained on the control plane is preserved. Thus, resetting and restarting of the data plane can be performed in a few seconds rather than several minutes needed to reacquire the state information in order to restart the entire aggregation router, including the control plane. In addition, the router is still considered an active intermediate node to its neighboring routers in the network even though the data traffic forwarded to the router does not flow through the data plane. This aspect of the invention obviates the need to recompute and re-converge forwarding databases in the network.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for restarting a data plane of an intermediate node of a computer network without affecting state information stored on a control plane of the node, the method comprising the steps of:

executing an operating system on a supervisor processor, the operating system having a platform independent code region and a platform specific code region, the platform independent code region having code features to build forwarding information base (FIB) tables for designated protocols;

coupling client software to each code feature, the client software also coupling to the platform specific code region of the operating system;

maintaining a current state of the control plane with the supervisor processor of the control plane;

detecting a fatal error in the data plane at the supervisor processor, the data plane including hardware components;

notifying the client software about the fatal error;

restarting only the data plane while continuing operation of the control plane; and loading software into the hardware components of the data plane by the client software.

2. The method of claim 1 wherein the step of detecting comprises the step of reporting an exception state by at least one hardware component of the data plane.

3. The method of claim 2 wherein the at least one hardware component is a forwarding engine of the data plane.

4. The method of claim 2 further comprising the steps of, in response to the step of detecting:

notifying clients of an operating system about the fatal error, the operating system executing on the supervisor processor;

invoking an exception handler routine to resolve the fatal error; and terminating further attempts by the clients to access the hardware components of data plane while in the exception state.

5. A method for restarting a data plane of an intermediate node of a computer network without affecting state information stored on a control plane of the node, the method comprising the steps of:

maintaining a current state of the control plane with a supervisor processor of the control plane;

reporting an exception state by at least one hardware component of the data plane to detect a fatal error in the data plane at the supervisor processor, the data plane including hardware components;

restarting only the data plane while continuing operation of the control plane;

issuing registered call back functions to the clients from driver software executing on the supervisor processor to notify clients of an operating system about the fatal error, the operating system executing on the supervisor processor;

invoking an exception handler routine to resolve the fatal error; and terminating further attempts by the clients to access the hardware components of data plane while in the exception state.

6. The method of claim 4 wherein the step of invoking comprises the steps of:

collecting information to determine a source of the fatal error; and debugging the fatal error using the collected information.

7. The method of claim 4 wherein the step of restarting comprises the steps of, in response to resolving the fatal error:

resetting the hardware components of the data plane; and re-synchronizing the hardware components with the state information stored on the control plane.

8. The method of claim 7 wherein the step of re-synchronizing comprises the step of re-synchronizing a forwarding engine of the data plane.

9. The method of claim 7 wherein the step of restarting further comprises the step of reloading software into the hardware components of the data plane.

10. The method of claim 7 wherein the state information comprises interface states of line cards within the intermediate node.

11. The method of claim 7 further comprising the steps of notifying the clients that they can again access the hardware components of data plane; and downloading configuration information into the hardware components of the data plane.

12. The method of claim 11 wherein the step of downloading comprises the step of downloading configuration information into a forwarding engine of the data plane.

13. The method of claim 1 wherein the step of restarting comprises the steps of:

resetting the hardware components of the data plane; and re-synchronizing the hardware components with the state information stored on the control plane.

14. The method of claim 13 wherein the step of re-synchronizing comprises the step of re-synchronizing a forwarding engine of the data plane.

15. The method of claim 13 wherein the step of restarting further comprises the step of reloading software into the hardware components of the data plane.

16. The method of claim 13 wherein the state information comprises interface states of line cards within the intermediate node.

17. A system for restarting a data plane of an intermediate node of a computer network without changing state information stored on a control plane of the node, the system comprising:

components of the data plane adapted to receive packets from the computer network and provide the packets to a forwarding engine of the data plane, the forwarding engine configured to perform forwarding operations on the packets;

a supervisor processor of the control plane configured to manage traffic forwarding operations of the node and maintain a current state of the control plane, the supervisor processor detecting a fatal error in the data plane and restarting only the data plane while continuing operation of the control plane;

means for executing an operating system on the supervisor processor, the operating system having a platform independent code region and a platform specific code region, the platform independent code region having code features to build forwarding information base (FIB) tables for designated protocols;

means for coupling client software to each code feature, the client software also coupling to the platform specific code region of the operating system;

means for notifying the client software about the fatal error; and means for loading software into the hardware components of the data plane by the client software in response to the restarting the data plane.

18. The system of claim 17 further comprising:

an operating system executing on the supervisor processor;

a plurality of client modules logically interacting with reset software of the operating system to enable execution of portions of the reset software that control the data plane;

a driver executed by the supervisor processor, the driver notifying the client modules of the fatal error; and an exception handler invoked by the operating system to resolve the fatal error.

19. The system of claim 17 wherein the intermediate node is a router.

20. The system of claim 17 wherein the intermediate node is an aggregation router.

21. The system of claim 20 wherein the supervisor processor is a route processor.

22. The system of claim 21 wherein the route processor restarts the data plane by resetting the components of the data plane and re-synchronizing the forwarding engine with the state information stored on the control plane.

23. The system of claim 22 wherein the state information comprises interface states of line cards within the aggregation router.

24. Apparatus for restarting a data plane of an intermediate network node without affecting state information stored on a control plane of the node, the apparatus comprising:

means for maintaining a current state of the control plane;

means for detecting a fatal error in the data plane, the data plane including hardware components;

means for restarting only the data plane while continuing operation of the control plane;

means for executing an operating system on the supervisor processor, the operating system having a platform independent code region and a platform specific code region, the platform independent code region having code features to build forwarding information base (FIB) tables for designated protocols;

means for coupling client software to each code feature, the client software also coupling to the platform specific code region of the operating system;

means for notifying the client software about the fatal error; and means for loading software into the hardware components of the data plane by the client software in response to the restarting the data plane.

25. The apparatus of claim 24 wherein the means for detecting comprises means for reporting an exception state by at least one hardware component of the data plane.

26. The apparatus of claim 25 further comprising, in response to the means for detecting:

means for notifying clients of an operating system of the control plane about the fatal error;

means for invoking an exception handler routine to resolve the fatal error; and means for terminating further attempts by the clients to access the hardware components of data plane while in the exception state.

27. The apparatus of claim 26 wherein the means for restarting comprises, in response to resolving the fatal error:

means for resetting the hardware components of the data plane; and means for re-synchronizing the hardware components with the state information stored on the control plane.

28. A computer readable medium containing executable program instructions for restarting a data plane of a router without changing state information stored on a control plane of the router, the executable program instructions comprising program instructions for:

maintaining a current state of the control plane with a supervisor processor of the control plane;

detecting a fatal error in the data plane at the supervisor processor, the data plane including hardware components;

restarting only the data plane while continuing operation of the control plane;

executing an operating system on the supervisor processor, the operating system having a platform independent code region and a platform specific code region, the platform independent code region having code features to build forwarding information base (FIB) tables for designated protocols;

coupling client software to each code feature, the client software also coupling to the platform specific code region of the operating system;

notifying the client software about the fatal error; and loading software into the hardware components of the data plane by the client software in response to the restarting the data plane.

29. The computer readable medium of claim 28 wherein the program instruction for detecting comprises a program instruction for reporting an exception state by at least one hardware component of the data plane.

30. The computer readable medium of claim 29 further comprising program instructions for, in response to the program instruction for detecting:

notifying clients of an operating system about the fatal error, the operating system executing on the supervisor processor;

invoking an exception handler routine to resolve the fatal error; and terminating further attempts by the clients to access the hardware components of data plane while in the exception state.

31. The computer readable medium of claim 30 wherein the program instruction for restarting comprises program instructions for, in response to resolving the fatal error:

resetting the hardware components of the data plane; and re-synchronizing the hardware components with the state information stored on the control plane.

32. Electromagnetic signals propagating on a computer network, comprising:

said electromagnetic signals carrying instructions for execution on a processor for the practice of the method steps, executing an operating system on a supervisor processor, the operating system having a platform independent code region and a platform specific code region, the platform independent code region having code features to build forwarding information base (FIB) tables for designated protocols;

coupling client software to each code feature, the client software also coupling to the platform specific code region of the operating system;

maintaining a current state of the control plane with the supervisor processor of the control plane;

detecting a fatal error in the data plane at the supervisor processor, the data plane including hardware components;

notifying the client software about the fatal error;

restarting only the data plane while continuing operation of the control plane; and loading software into the hardware components of the data plane by the client software to restart a data plane of an intermediate node of a computer network without affecting state information stored on a control plane of the node.

33. An intermediate node of a computer network, comprising:

components of a data plane adapted to receive packets from the computer network and provide the packets to a forwarding engine of the data plane, the forwarding engine configured to perform forwarding operations on the packets;

a supervisor processor of the control plane configured to manage traffic forwarding operations of the node and maintain a current state of the control plane, the supervisor processor detecting a fatal error in the data plane and restarting only the data plane while continuing operation of the control plane;

means for executing an operating system on the supervisor processor, the operating system having a platform independent code region and a platform specific code region, the platform independent code region having code features to build forwarding information base (FIB) tables for designated protocols;

means for coupling client software to each code feature, the client software also coupling to the platform specific code region of the operating system;

means for notifying the client software about the fatal error; and means for loading software into the hardware components of the data plane by the client software in response to the restarting the data plane, to restart the data plane without changing state information stored on the control plane of the node.

* * * * *